(12) United States Patent
Lohmann

(10) Patent No.: US 7,055,641 B2
(45) Date of Patent: Jun. 6, 2006

(54) FRAME FOR THE DRIVE UNIT OF AN INDUSTRIAL TRUCK, PARTICULARLY A STACKER LIFT TRUCK

(75) Inventor: Helmut Lohmann, Gyhum Nartum (DE)

(73) Assignee: Jungheinrich AG, Hamburg (DE)

( * ) Notice: Subject to any disclaimer, the term of this patent is extended or adjusted under 35 U.S.C. 154(b) by 82 days.

(21) Appl. No.: 10/437,153

(22) Filed: May 13, 2003

(65) Prior Publication Data

US 2003/0213638 A1   Nov. 20, 2003

(30) Foreign Application Priority Data

May 14, 2002   (DE) ................. 102 21 312

(51) Int. Cl.
*B62D 21/00* (2006.01)
(52) U.S. Cl. .............. 180/311; 280/781; 414/444; 296/203.1; 296/204
(58) Field of Classification Search ............... 280/781, 280/785, 797; 180/89.1, 89.12, 311, 312, 180/299; 296/203.1, 204; 414/444
See application file for complete search history.

(56) References Cited

U.S. PATENT DOCUMENTS

| 3,895,728 | A | * | 7/1975 | Heggen ................. 414/697 |
| 4,173,264 | A | * | 11/1979 | Erker et al. ............. 180/68.5 |
| 4,342,470 | A | * | 8/1982 | Matsuda ................ 280/785 |
| 4,811,473 | A | | 3/1989 | Link ..................... 29/430 |
| 5,114,207 | A | * | 5/1992 | Nakajima et al. ........ 296/204 |
| 5,174,627 | A | * | 12/1992 | Cleereman et al. ...... 296/181.2 |
| 5,568,841 | A | * | 10/1996 | Weissbach ............. 180/311 |
| 6,293,364 | B1 | * | 9/2001 | Anderson et al. ........ 180/312 |

FOREIGN PATENT DOCUMENTS

| DE | 195 05 457 | 2/1995 |
| DE | 299 18 832 | 2/2000 |
| DE | 100 13 079 | 3/2000 |
| EP | 0 231 642 | 8/1987 |

* cited by examiner

*Primary Examiner*—Paul N. Dickson
*Assistant Examiner*—Toan C. To
(74) *Attorney, Agent, or Firm*—Vidas, Arrett & Steinkraus, P.A.

(57) ABSTRACT

A frame for the drive unit of an industrial truck, particularly a stacker lift truck which, inter alia, serves as a carrier of a lifting device and/or travel drive. The frame having a forward-facing apron formed in the shape of a bow from a cut-to-size flat sheet metal piece and a one-piece rear wall formed from a cut-to-size flat sheet metal piece connected to the apron as a carrier unit for attachment and installation parts in the drive unit, which is chamfered and, as a result, has an upper portion and lateral portions which also define visible surface portions of the casing for the drive unit.

14 Claims, 3 Drawing Sheets

FRAME FOR THE DRIVE UNIT OF AN INDUSTRIAL TRUCK, PARTICULARLY A STACKER LIFT TRUCK

CROSS-REFERENCE TO RELATED APPLICATIONS

Not Applicable.

STATEMENT REGARDING FEDERALLY SPONSORED RESEARCH

Not Applicable.

BACKGROUND OF THE INVENTION

A frame of the generic type has become known from DE 299 18 832 U1. The frame is intended for receiving forces of a lifting device and for receiving forces of at least one wheel of the industrial truck and its drive and has two perpendicularly disposed plates which are oriented in parallel with the longitudinal axis of the industrial truck and are spaced from each other in the transverse direction of the industrial truck.

The disadvantage of conventional drive frames is that they are made of a series of single parts which are welded together. The large number of welded components and, hence, the considerable length of the welds result in a manufacturing expenditure which is not insignificant.

It is the object of this invention to provide a frame for the drive unit of an industrial truck that is made of a minimum number of single parts and can be manufactured at a reduced expenditure while its quality increases.

BRIEF SUMMARY OF THE INVENTION

The inventive frame comprises a forward-facing apron formed in the shape of a bow from a cut-to-size flat sheet metal piece, which defines the lower front and lateral visible surface of the industrial truck, and a one-piece rear wall formed from a cut-to-size flat sheet metal piece that is connected to the apron. The rear wall serves as a carrier unit for attachment and installation parts in the drive unit. It has upper and lateral portions formed by chamfers which also define visible surface portions of the casing for the drive unit. The parts described, along with particular carriers which are preferably formed from thicker sheet metal pieces and are welded to the rear wall, reduce the overall number of the parts to be joined by welding to a very low degree, which significantly reduces the mounting expenditure. A reduction in the number of welds and lengths of the welds also improves the product quality with the cost of manufacture being low.

The upper portion and lateral portions not only are simply chamfered, but are continuously shaped so as to impart considerable stability to the rear wall. At the free edges, the upper portion and/or lateral portions may have chamfered portions which are inwardly and downwardly or sidewardly bent and can also be continuous and further increase the stability of the frame.

The stability of the rear wall is also increased by the fact that the rear wall has raised or recessed surface portions which cause the sheet metal to be stiffened as bead bands do. According to an aspect of the invention, a recessed surface portion at the back of the rear wall may define a reception channel for cables which are passed forwards through an opening in the rear wall.

According to another aspect of the invention, impressions and recesses may be formed in the raised or recessed surface portion to mount clip nuts or the like therein. The clip nuts allow to attach installation parts thereto in a simple manner with the structural length of the frame not being increased by the nuts as they are mounted in a recessed portion as mentioned.

Further, according to another aspect of the invention the rear wall may have provided therein openings to partially receive units and installation parts. This utilizes the clearance zone which exists up to the connection of the load-carrying section. Although the spacing from the load-carrying section is relatively small it allows for a certain overhang of installation parts beyond the rear wall with no detrimental contact occurring.

According to another aspect of the invention, the upper portion has two spaced sub-portions which are interconnected by a forwardly bent central web under which an opening is formed in the rear wall to partially receive a lifting cylinder. As is known the lifting cylinder serves for the free lift of the load-carrying section including an actuation of the cinematic lifting device for the wheel arms.

According to another aspect of the invention, the rear wall is forwardly bent over at the lower end and, as a result, two wing-like bottom portions are formed which leave a clearance zone between them. The bottom portions allow to place appropriate parts thereon. The clearance zone between the bottom portions serves for receiving driving components and a driving wheel.

Downwardly facing stiffening webs can be formed by bending them off the bottom portions.

Appropriate provisions need to be made to mount the travel drive and/or the lifting device. It is useful to mount them directly on the rear wall. Therefore, the invention provides carrier portions which are welded to the front side of the rear wall. It is preferred that the carrier portions be arranged on opposed sides of an upper central opening. Furthermore, the carrier portions are integral on each side of the opening. They are preferably formed from flat cut-to-size sheet metal pieces which, however, are larger in thickness than is the cut-to-size piece for the rear wall.

BRIEF DESCRIPTION OF THE SEVERAL VIEWS OF THE DRAWINGS

An embodiment will be explained below with reference to the drawings.

DETAILED DESCRIPTION OF THE INVENTION

Figure 1:
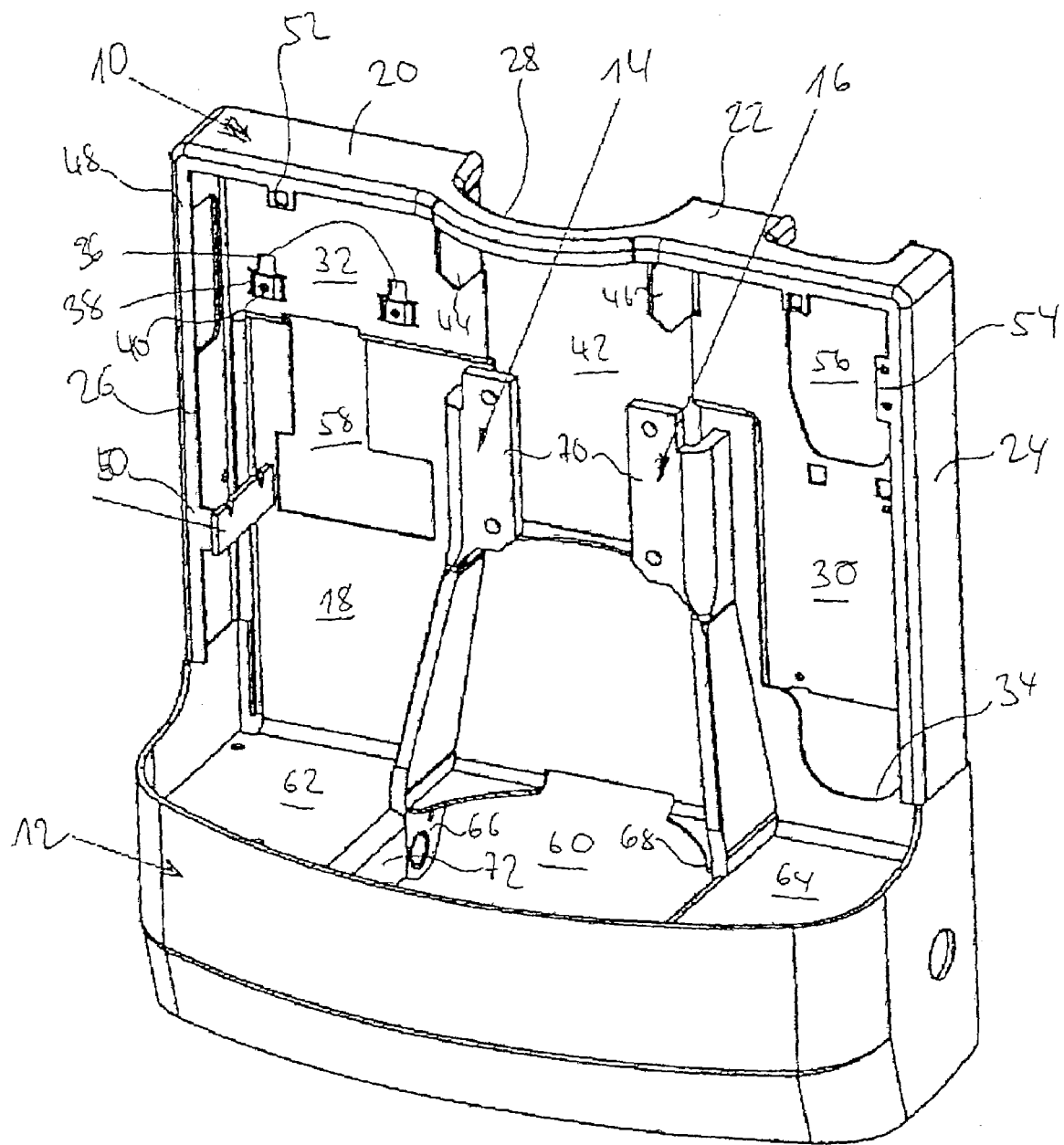
FIG. 1 shows a perspective view of an inventive frame as seen from the front.

While this invention may be embodied in many different forms, there are described in detail herein a specific preferred embodiment of the invention. This description is an exemplification of the principles of the invention and is not intended to limit the invention to the particular embodiment illustrated The frame illustrated in FIGS. 1 and 2 substantially comprises four single components, i.e. a box-like rear wall 10, a bow-shaped apron 12, and two carrier elements 14, 16 which are welded to the front of the rear wall 10. Reference will now be made in detail to the individual components.

The rear wall 10 has a rear wall portion 18 from the extension of which flange-like upper portions 20, 22 and lateral portions 24, 26 are bent away to the front approximately at right angles. Portions 22, 24, on one hand, and 20, 26, on the other, merge into each other and portions 20, 22 are interconnected by a forwardly bent arc-shaped web 28. The portions 18 to 28 described are integrally formed from a flat cut-to-size sheet metal piece and are brought to assume the shape shown by means of appropriate bending and pressing operations. The bent-away portions 22 to 26 cause the rear wall 10 to be stiffened considerably. The rear wall surface 18 is stiffened by portions 30, 32 which are forwardly raised and, thus, form bead bands. At the back (FIG. 2), portion 30 defines a channel to receive cables which are not shown and, arriving from the battery in the load-carrying section, can be passed downwards in the channel and forwards to the opening 34 for connection to the travel drive and the lifting device. In portion 32, two recesses can be recognized which are spanned by bridge-like embossed members 38 which are capable of receiving a clip nut or the like as is shown at 40. The clip nuts serve for attaching a structural part (not shown).

Below the web 28, a rectangular opening 42 is formed which serves for partially receiving a lifting cylinder which is not shown. Below the web 28 at either side of the opening 42, forwardly bent lobes 44, 46 can be recognized which also serve for stiffening. What still should be added is that the free edges of the portions 20 to 22 have formed thereon a bend 48 which extends over the full length and height of portions 20 to 26 to stiffen them additionally. The bend 48 is also formed continuously. The bend has lugs as are shown at 50, 52, and 54 to mount installation parts. An opening 56 is formed below the upper portion 22 and an opening 58 is formed below the portion 32 which serve for partially receiving structural parts which are housed or mounted in the drive unit.

At the lower end of the rear wall portion 18, wing-like bottom portions 62, 64 are formed by chamfers at either side of a central opening 60. Bottom portions 62, 64 have slot-like openings for the passage of support components 66, 68 which may be formed integrally with the carrier portions 14, 16. Carrier portions 14, 16 are fixedly welded into the slot-like openings of bottom portions 62, 64 and to the rear wall surface 18, namely in the upper region at either side of the opening 42. Carrier portions 14, 16 are equal as seen as inverted mirrors. They have mounting portions 70 provided with holes to which the driving mechanism (not shown) is fixed. The kinematic lifting device for the wheel arms (not shown) is hinged to the support components 66, 68.

Figure 2:
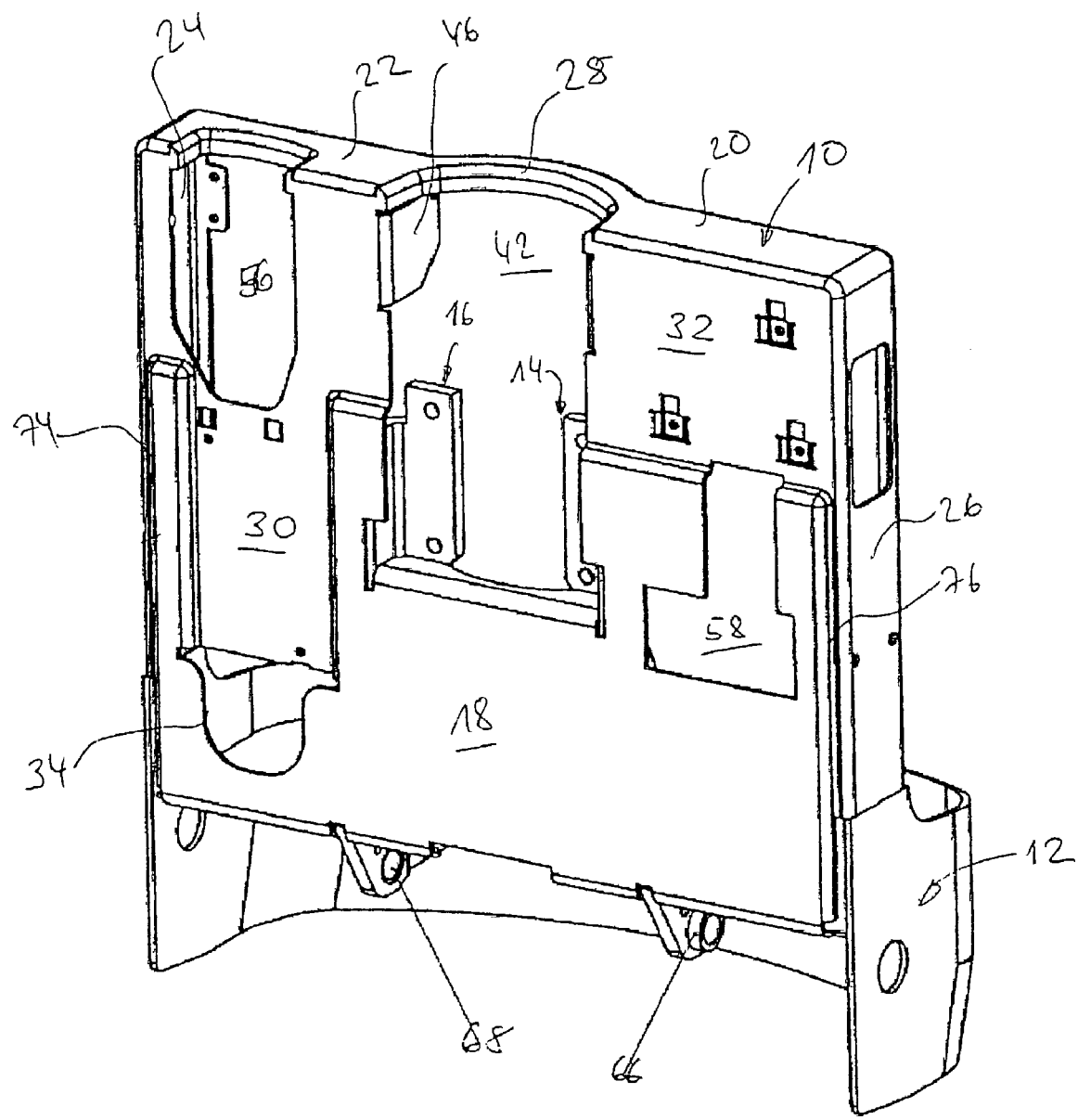
FIG. 2 shows a perspective view of the frame of FIG. 1 as seen from the back.

Bottom portions 62, 64 have downwardly chamfered stiffening webs of which only one can be recognized at 72 in FIG. 1.

The apron 12 is welded to the front edges and lateral edges of bottom portions 62, 64 and to the lower edges of lateral portions 24, 26 and the lower lateral edges of the rear wall portion 18. It forms the visible surface of the drive unit forwards and sidewards in the lower region. Lateral portions 24, 26 and upper portions 20, 22 also form visible surfaces for the drive unit. Bead bands 74, 76 non only strengthen the rear wall surface 18, but also serve as a sight and lock-preventing element in the gap towards the load-carrying frame.

As is evident the complex configuration of the rear wall 12 results in a very low number of components of the welded structure while its full functionality is maintained. Since the number of parts is reduced the number of welds and the weld lengths are also reduced in manufacture. Since manufacture relies very much on tool use quality increases while the manufacturing cost is reduced. Finally, since the rear wall has a specific configuration, the way of mounting components on the rear wall allows to markedly shorten the overall length of the drive unit.

Figure 3:
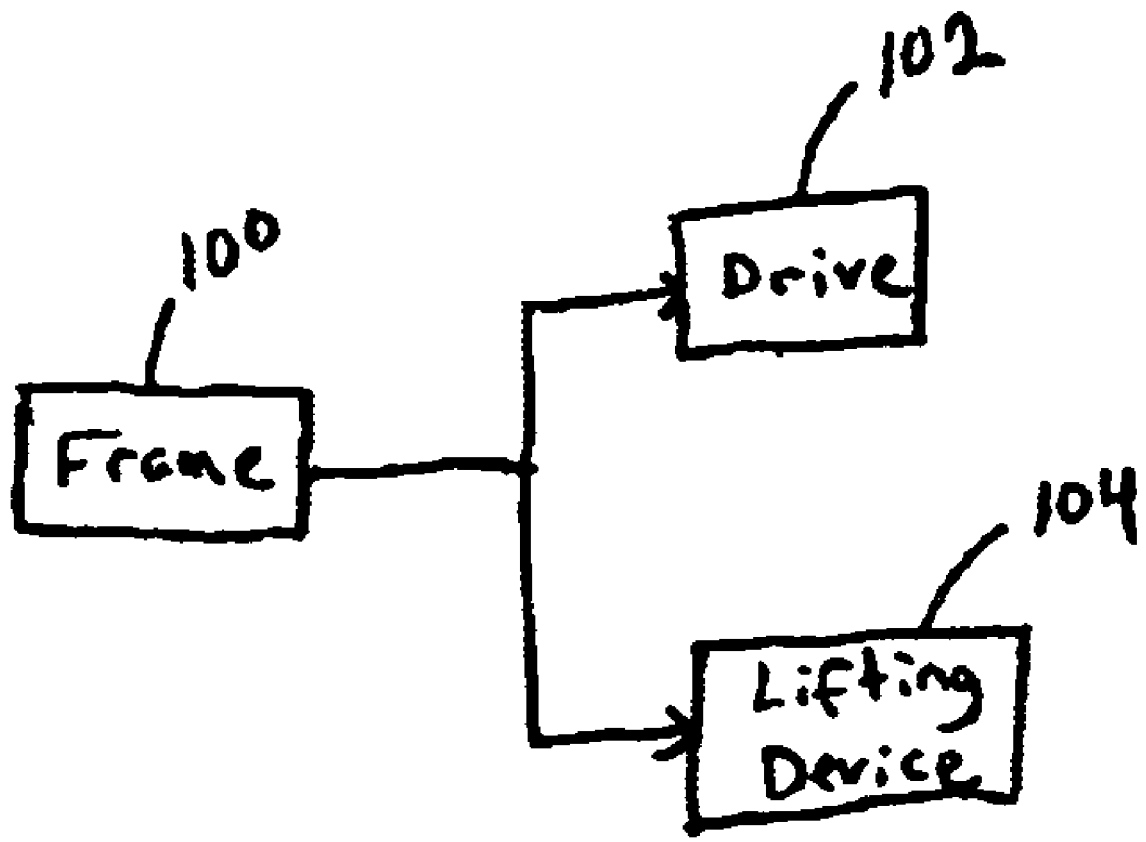
FIG. 3 is a block diagram showing the frame, drive and lifting device.

FIG. 3 is a block diagram which shows the frame 102, which receives the forces of the drive 102 and the forces of the lifting device 104.

The above Examples and disclosure are intended to be illustrative and not exhaustive. These examples and description will suggest many variations and alternatives to one of ordinary skill in this art. All these alternative and variations are intended to be included within the scope of the attached claims. Those familiar with the art may recognize other equivalents to the specific embodiments described herein which equivalents are also intended to be encompassed by the claims attached hereto

What is claimed is:

1. A frame for an industrial truck, the truck having a drive portion including the housing and a drive unit within the housing and a lifting portion, the frame comprising:
    a forward facing apron cut out of sheet metal in a single piece and bent into a bow-shape, the apron being adapted to form front and lateral visible surfaces of the housing,
    an upright rear wall connected to the apron and adapted to support the drive unit, and
    upper and lateral portions adapted to define visible surface portions of the housing, the rear wall being formed out of a cut blank of sheet metal and formed by a cold forming process, the upper and lateral portions being part of the rear wall and bent out of the rear wall in the cold forming process,
        characterized in that the upper portion and/or the lateral portions, at free edges, have inwardly and downwardly bent portions which are continuous and further that impressions and recesses are formed in a raised or recessed surface portion adapted for mount clip nuts therein.

2. The frame as claimed in claim 1, characterized in that upper and lateral portions are continuously bent out of the rear wall surface.

3. The frame as claimed in claim 1, characterized in that the rear wall has raised or recessed surface portions.

4. The frame as claimed in claim 3, characterized in that a recessed surface portion, at the back of the rear wall is adapted to define a channel.

5. The frame as claimed in claim 1, characterized in that the rear wall has provided therein openings adapted to partially receive units and installation parts.

6. The frame as claimed in claim 1, characterized in that two carrier portions are welded to the front side of the rear wall and formed of sheet metal, the carrier portions being adapted to support the drive unit or the lifting portion.

7. The frame as claimed in claim 6, characterized in that each of said carrier portions are integrally formed, of sheet metal or by forging, with a coupling portion.

8. The frame as claimed in claim 1, characterized in that coupling portions are welded to the rear wall and/or bottom portions wall to support a kinematic lifting device.

9. The frame as claimed in claim 1, characterized in that the downwardly bent portions have lugs formed thereto adapted to mount attachment parts thereon.

10. A frame for an industrial truck, the truck having a drive portion including the housing and a drive unit within the housing and a lifting portion, the frame comprising:

a forward facing apron cut out of sheet metal in a single piece and bent into a bow-shape, the apron being adapted to form front and lateral visible surfaces of the housing, an upright rear wall connected to the apron and adapted to support the drive unit, and upper and lateral portions adapted to define visible surface portions of the housing, the rear wall being formed out of a cut blank of sheet metal and formed by a cold forming process, the upper and lateral portions being part of the rear wail and bent out of the rear wall in the cold forming process;

further wherein the upper portion has two spaced sub-portions which are interconnected by a forwardly bent central web under which an opening is formed in the rear wall.

11. The frame as claimed in claim 10, characterized in that stiffening portions which are forwardly bent from the rear wall are formed below the web.

12. The frame as claimed in claim 10, characterized in that said carrier portions are disposed at either side next to the opening.

13. A frame for an industrial truck, the truck having a drive portion including the housing and a drive unit within the housing and a lifting portion, the frame comprising:

a forward facing apron cut out of sheet metal in a single piece and bent into a bow-shape, the apron being adapted to form front and lateral visible surfaces of the housing, an upright rear wall connected to the apron and adapted to support the drive unit, and upper and lateral portions adapted to define visible surface portions of the housing, the rear wall being formed out of a cut blank of sheet metal and formed by a cold forming process, the upper and lateral portions being part of the rear wall and bent out of the rear wall in the cold forming process, characterized in that the rear wall is forwardly bent over at a lower end and, as a result, two bottom wing portions are formed which leave a clearance zone between tern.

14. The frame as claimed in claim 13, characterized in tat downwardly facing stiffening webs are formed by bending tern off the bottom wing portions.

* * * * *